United States Patent
Coudron

(10) Patent No.: US 11,207,956 B2
(45) Date of Patent: Dec. 28, 2021

(54) BODYWORK PART COMPRISING A LOCK LOOP

(71) Applicant: Compagnie Plastic Omnium, Lyons (FR)

(72) Inventor: Philippe Coudron, Sainte-Julie (FR)

(73) Assignee: Compagnie Plastic Omnium, Lyons (FR)

( * ) Notice: Subject to any disclaimer, the term of this patent is extended or adjusted under 35 U.S.C. 154(b) by 139 days.

(21) Appl. No.: 16/722,031

(22) Filed: Dec. 20, 2019

(65) Prior Publication Data

US 2020/0198448 A1 Jun. 25, 2020

(30) Foreign Application Priority Data

Dec. 21, 2018 (FR) .................................. FR1873929

(51) Int. Cl.
*B60J 5/04* (2006.01)
*B60J 5/10* (2006.01)

(52) U.S. Cl.
CPC ............. *B60J 5/044* (2013.01); *B60J 5/0455* (2013.01); *B60J 5/107* (2013.01)

(58) Field of Classification Search
CPC .................................. B60J 5/107; B60J 5/044
USPC ............................................ 296/146.6, 146.8
See application file for complete search history.

(56) References Cited

U.S. PATENT DOCUMENTS

| | | | |
|---|---|---|---|
| 3,700,076 A * | 10/1972 | Forsting | B60J 5/044 188/371 |
| 5,895,088 A * | 4/1999 | Knott | B60J 5/0458 296/187.12 |
| 8,550,536 B2 * | 10/2013 | Gachter | B60J 5/101 296/146.8 |
| 2003/0184058 A1 | 10/2003 | Gray et al. | |
| 2012/0280533 A1 * | 11/2012 | Gachter | B60J 5/107 296/146.8 |
| 2019/0184799 A1 * | 6/2019 | Kerschbaum | B29C 45/14336 |
| 2020/0114739 A1 * | 4/2020 | Kuntze | B60S 1/583 |
| 2020/0164929 A1 * | 5/2020 | Kuntze | B62D 29/048 |
| 2020/0199907 A1 * | 6/2020 | Coudron | B62D 33/023 |

FOREIGN PATENT DOCUMENTS

EP 2776290 B1 8/2017
WO WO-2013070129 A1 5/2013

* cited by examiner

*Primary Examiner* — Jason S Morrow
(74) *Attorney, Agent, or Firm* — Shackelford, Bowen, McKinley & Norton, LLP

(57) ABSTRACT

A bodywork part of a motor vehicle includes a main body of plastic material and at least one structural reinforcement fastened at least partially to a first part main body. The piece also includes at least one connecting member of the first part and of a second part of the main body including an end, a portion of which forms a lock loop around a clamping element so as to secure the connecting member, the structural reinforcement and the first part.

14 Claims, 7 Drawing Sheets

BODYWORK PART COMPRISING A LOCK LOOP

The present invention relates to the automotive field and more particularly the bodywork parts of motor vehicles made of plastic. The invention deals more precisely with the safety of such parts during an impact while driving.

Bodywork parts are known that comprise shock-resistant systems based upon structural reinforcements or shock absorbers making it possible to ensure the safety of users in case of impact, especially in case of impact with another vehicle.

However, such impacts, when they occur during driving, are more violent and can lead to separation into at least two distinct parts of the impacted part. One of these parts may become detached and end up on the road, posing a risk to the safety of other road users behind the vehicle.

To mitigate for this safety constraint, known solutions consist in integrating, within the part, a connecting element which connects two separable parts during a impact of the bodywork part. It is possible to determine, by tests and calculations, the zones of least resistance of the part, thus defining the zones of rupture and therefore the localization, in the part with the parts that can separate under the effect of an impact. Such a known connecting element may be braided fibers or a wire rope.

More specifically, one end of this connecting element is attached to a structural reinforcement present in one of the parts of the bodywork part and connects the reinforcement to a point of strong mechanical strength with the vehicle body present in the other part of the bodywork part. This ensures a mechanical connection between the two parts of the bodywork part.

For example, the use of a wire cable with lugs crimped at its ends is known, but this considerably increases the weight of the part and, by extension, the vehicle, which is a real disadvantage in the automotive field. In addition, the use of a wire rope can generate noise during driving due to vibration of the cable.

A disadvantage of these known solutions is that the attachment of the end of the connecting element to the structural reinforcement involves often complex assembly steps, such as screwing or welding, which considerably lengthen the manufacturing process of the piece Therefore, these steps greatly increase the cost of producing parts.

The invention aims to remedy these disadvantages by providing a motor vehicle bodywork part comprising:

a plastic main body comprising at least a first part and a second part, the first part having at least one orifice, at least one structural reinforcement fastened at least partially on the first part, the structural reinforcement having at least one orifice opposite the orifice of the first part, so as to form a through-hole, at least one connecting member of the first part and the second part comprising one end, said end comprising at least one portion penetrating at least once in the through-hole and forming a lock loop around a clamping member so as to secure the connecting member, the structural reinforcement and the first part.

Thus, the locking between the connecting member, connecting the first part and the second part of the main body, and the assembly consisting of the structural reinforcement fastened to the first part of the main body, can be achieved simply and quickly. Indeed, the through-hole formed by the respective orifices of the structural reinforcement and the first part of the main body, offers the possibility of introducing one end of the connecting member and forming a locking loop around the body of the clamping member. This loop makes it possible to secure the assembly at this precise location of the part. Thus, given the fact that the connecting member binds the two parts of the main body and taking into account the localized locking, as well as a connection between the connecting member and the second part, the two parts of the part remain linked even if the piece is broken into two parts as a result of an impact. The part according to the invention therefore makes it possible to respond efficiently to the safety problems related to impacts suffered by the bodywork parts while driving, without, however, complicating the manufacturing process, nor increasing the cost of production of the connecting element and of the part.

By "first part and second part of the main body of the bodywork part" is meant two parts of the part which are known to be at risk of being separated under the effect of a impact. By way of non-limiting example, the first part may be the upper part of a hatchback intended to be connected to the vehicle body, and the second part may be the lower part of the hatchback including the lock block. The two parts of the bodywork part of the invention may be adjacent or separated by one or more parts. In the case of a first part and a second part, adjacent to each other, they are preferably delineated by a zone of lower mechanical resistance which is known to be likely to break more easily in case of violent impact. These two parts are preferably together as a whole. Moreover, they are preferably made from the same material.

The connecting member is a member for maintaining a permanent connection between the first part and the second part of the main body, even after these two parts have been disengaged, after an impact for example. As such, the connecting member may be a braid, for example a fiberglass braid. Preferably, the braid is of flat section.

The lock loop can be obtained in many ways. It can be obtained by bypassing a clamping element from the first part of the main body or the structural reinforcement, or attached to the structural reinforcement or/and the first part of the main body. This clamping element protrudes from the side opposite to the side from which the end of the connecting member is inserted into the through-hole (hereinafter referred to as the "insertion side"). In so doing, the portion introduced from the end of the connecting member bypasses the projecting clamping element before being brought back to the insertion side. In the case where a single through-hole is provided, the end of the connecting member passes through the through-hole twice. The projecting clamping element may be an element attached to the structural reinforcement and/or to the first part of the main body or may be an element integral with the structural reinforcement or the first part.

The lock loop can also be obtained as follows. The structural reinforcement and the first part of the main body have a plurality of through-holes, each of these holes being obtained in the same manner as the first through-hole presented, namely by facing two orifices, one present in the structural reinforcement and the other present in the first part of the main body. In the embodiment where the structural reinforcement and the first part have a pair of through-holes, the end of the connecting member may be introduced through a through-hole and be brought back to the insertion side through the other through-hole. In this example, the lock loop can be formed around a clamping element such as one of those described in the previous example or around the surface of the part separating the two through-holes. In this second case, the surface of the part separating the two through-holes constitutes the clamping element around which the lock loop is formed.

Advantageously, the first part of the main body and/or the structural reinforcement comprise, at the periphery of their respective orifices, at least one edge having a relief capable of wedging the portion of the end forming the lock loop.

Thus, this presence of one or more edges forming one or more adapted reliefs makes it possible to apply mechanical stress on the portions of the end of the connecting member in contact with these edges. Therefore, the freedom of movement of the end of the connecting member is reduced and the risks of separation between the connecting member, the structural reinforcement and the first part are reduced. In addition, depending on the reliefs applied on the edges and the tension applied to the connecting member, during the formation of the lock loop, the mechanical stress applied to the portions of the end of the connecting member in contact with the edges can result in a strict immobilization of the end of the connecting member, once the lock loop formed.

Advantageously, a portion of the end inserted into the through-hole is fastened to a non-introduced portion of said end, preferably by adhesive bonding.

Thus, with the fastening of a portion of the inserted end of the lock loop and a not introduced portion of the same end provides additional security to reduce the risks of loosening of the lock loop. Such a fastening can be obtained through bonding between these two portions, but also by any other means known to those skilled in the art. In the case of gluing, it is conceivable to provide for the removal of a protective film from an adhesive zone, present on at least one of the faces of a portion of the end, this face being intended to be contacting another face to achieve the fastening. Such an implementation is quick and easy for an operator.

Alternatively, or in addition to the gluing, the connecting member may be provided—at least at two portions of the end forming the lock loop—with thermoplastic resin particles which, when they are heated and set in contact, make it possible to glue the two portions of the connecting member.

Advantageously, the connecting member is connected to an anchor point of the second part, said anchor point being, for example, a lock block.

The connecting member is thus connected, on the one hand, to one of the locations of the second part of the main body which represents a point of strong resistance firmly connected to the vehicle body and, on the other hand, to the structural reinforcement, which is attached to the first part of the main body. The two parts of the bodywork part according to this embodiment are therefore more securely held in place following an impact occurring during driving, given the attachment of the connecting member to points of strong mechanical strength in both parts of the main body of the part. In general, the anchor point, according to this invention, is a point of attachment to the vehicle body. By way of non-limiting example, a point of high mechanical strength may be formed by a lock block or by an internal reinforcement such as a lateral impact beam, connecting two lateral edges of a bodywork part or the hinge of an opening part (for example a side door or a tailgate).

Advantageously, the bodywork part further comprises a second structural reinforcement fastened at least partially to the first part of the main body, the second structural reinforcement having at least one orifice facing an orifice of the first part of the main body, so as to form a second through-hole.

Thus, it is possible to create a second place to connect the first part and the second part of the main body, either with the same connecting member or with an additional connecting member. The risks of losing the first part and/or the second part in case of impact is further reduced.

Advantageously, the connecting member comprises a second end, said second end comprising at least one portion penetrating at least once into the second through-hole and forming a second lock loop around a second clamping element so as to secure the connecting member, the second structural reinforcement and the first part.

Thus, the connecting member connects the two structural reinforcements, each fastened to a different portion of the first part of the main body, and thus doubly connects the first part and the second part of the main body. Preferably, the connecting member connects each assembly consisting of a structural reinforcement fastened to a portion of the first part at the same location as the second part, preferably an anchor point as defined above.

Advantageously, the bodywork part further comprises a second connecting member of the first part and of the second part, comprising one end, said end comprising at least one portion penetrating at least once into the second through-hole and forming a second loop locking around a second clamping element so as to secure the second connecting member, the second structural reinforcement and the first part.

Depending on the needs and constraints associated with the different geometries that the bodywork parts can adopt, it is thus possible to connect the first part to two different places of the second part. In other words, the first part can be connected, by means of the two connecting members, to two different anchoring points of the second part, each connecting member being connectable to one of said anchor points.

Advantageously, the second connecting member is connected to an anchor point of the second part, said anchor point being, for example, a lock block.

Advantageously, the part is an opening part, for example a hatchback or a side door.

When the part according to the invention is a hatchback, the first part may be the upper part of the hatchback which is connected to the hinges, whereas the second part may be the lower part comprising the lock block. A similar configuration is possible for "gull-wing" style side doors whose hinges are located on the roof of the vehicle rather than on the side. For side doors whose hinges are located on one side, the first part of the part may be the side part directly attached to the vehicle body, whereas the second part may be the other side part.

The invention also relates to a method of manufacturing a motor vehicle bodywork part characterized in that it comprises the following steps:

producing at least one structural reinforcement comprising at least one orifice, producing a plastic main body, the main body being subdivided into at least a first part and a second part, the first part having at least one orifice intended to be positioned facing the structural reinforcement orifice, fastening of the structural reinforcement at least partially on the first part of the main body so that the orifices facing one another form a through-hole, introducing at least a portion of an end of a connecting member of the first part and of the second part into the through-hole forming a lock loop around a clamping element so as to secure the connecting member, the structural reinforcement and the first part.

The step of fastening the structural reinforcement on the first part can be performed by any technique known to those skilled in the art. By way of example, such a method can be adhesive bonding, gluing, screwing, riveting or even molding.

Advantageously, the steps of producing the main body and fastening the structural reinforcement at least partially on the first part of the main body are performed concomitantly, by overmolding the structural reinforcement during molding of the main body.

Thus, the total duration of the manufacturing process and the space required for its production can both be reduced. The gains represented by such reductions lead to an overall reduction in the manufacturing cost of the bodywork part.

BRIEF DESCRIPTION OF THE FIGURES

The invention will be better understood upon reading the description which follows, given solely by way of example and with reference to the appended drawings in which.

DETAILED DESCRIPTION

Figure 1:
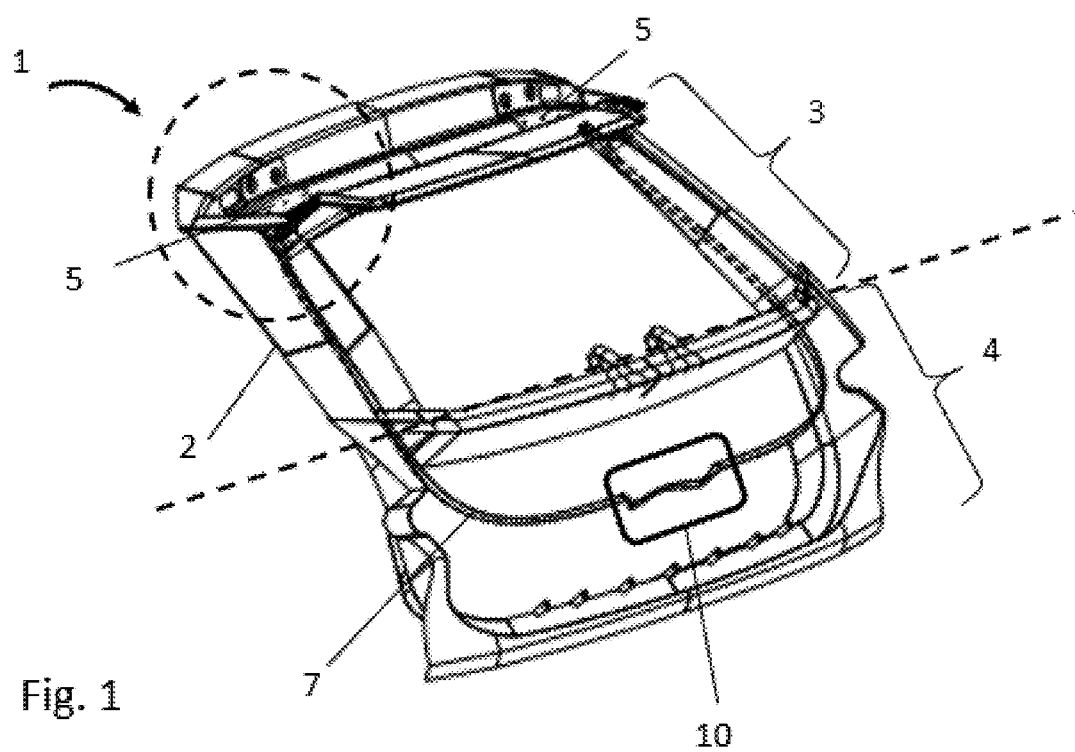
FIG. 1 is a diagram illustrating a hatchback according to the invention.

Vehicle bodywork part 1 according to the invention comprises a main body 2 of plastic material comprising at least a first part 3 and a second part 4, the first part 3 having at least one orifice. Bodywork part 1 also comprises at least one structural reinforcement 5 fastened at least partially on the first part 3, the structural reinforcement 5 having at least one orifice facing the orifice of the first part 3, so as to form a through-hole 6. In addition, part 1 comprises at least one connecting member 7 of the first part 3 and the second part 4 comprising an end 8, said end 9 comprising at least one portion penetrating at least once into the through-hole 6 and forming a lock loop 9 around a clamping element 13 so as to secure the connecting member 7, the structural reinforcement 5 and the first part 3.

We will henceforth describe this bodywork part 1 as a hatchback (FIG. 1). However, one skilled in the art will recognize the application of the invention to any other bodywork part likely to be separated into at least two parts during driving, following an impact, for example, a side door.

In the case of the hatchback shown in FIG. 1, the first part 3 of the main body 2 corresponds to the part above the dotted line of separation, and comprises the hinges allowing the tailgate to be fastened to the vehicle body (not shown). The second part 4 corresponds, in turn, to the part below the dotted line of separation, and comprises an anchor point, in this case a lock block 10 which represents a point of strong mechanical strength in the second part 4 of the main body 2, given its direct connection to the vehicle body. In this example of the invention, part 2 comprises two structural reinforcements 5, each attached to a different portion of the first part 3. These two structural reinforcements 5 are connected to each other via a single connecting member 7. The connecting member 7 extends into the main body 2, starting from the structural reinforcements 5 towards the second part 4 and passes through the lock block 10 of the second part 4.

Figure 2:
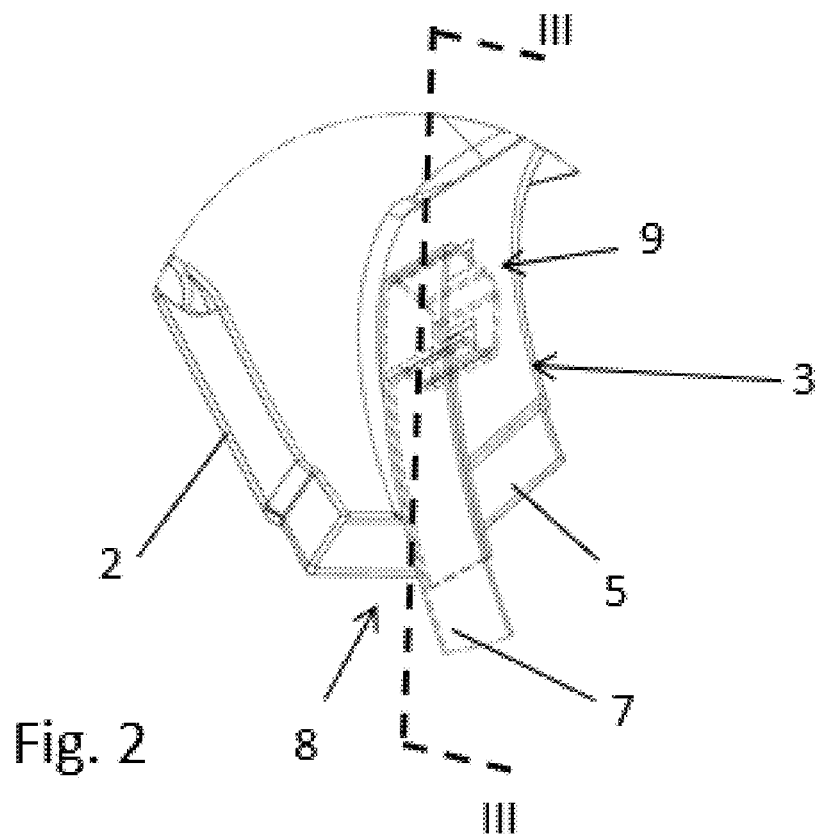
FIG. 2 is an enlarged view of a portion (dotted line) of the hatchback of FIG. 1.

As illustrated in FIG. 2, the lock loop 9 makes it possible to secure a connecting member 7, a structural reinforcement 5 and the portion of the first part 3 on which the structural reinforcement 5 is fastened. This locking loop 9 can be obtained in multiple ways, according to the embodiments shown in FIGS. 3 to 7, all these embodiments being applicable to the hatchback illustrated in FIG. 1.

In one of the non-illustrated embodiments of the lock loop 9, the first part 3 of the main body 2 comprises a clamping element 13 projecting from the opposite side to the insertion side of the end 8 of the connecting member 7. A portion of the end 8 is introduced into the through-hole 6, formed by an orifice present in the first part 3 of the main body 2 and an orifice present in the structural reinforcement 5 and passes right through the through-hole 6. The portion of the introduced end 8 bypasses the projecting clamping element 13 and leaves through the same through-hole 6, thus forming the lock loop 9. In other words, a portion of the end 8 passes through the through-hole 6 twice and thus returns to the insertion side once the lock loop 9 has been formed. Therefore, this specific portion of the end 8 can be attached to another portion of the connecting member 7 located on the insertion side to secure the formation of the locking loop 9 and, therefore, safeguard the securing of the connecting member 7, the structural reinforcement 5 and the portion of the first part 2 on which the structural reinforcement 5 is fastened.

Figure 3:
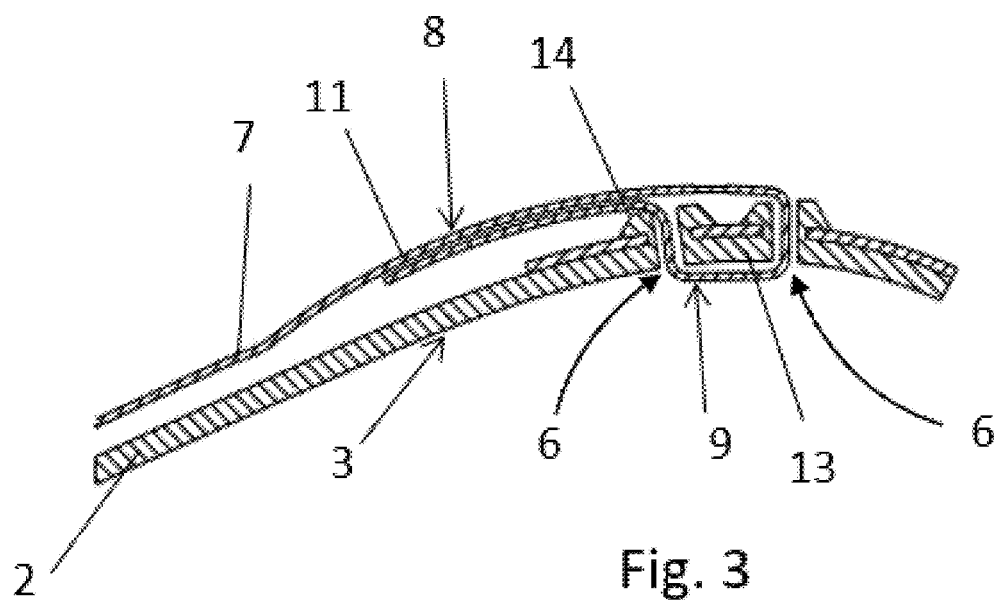
FIG. 3 is a section along the section plane III-III of FIG. 2, illustrating an assembly of a connecting member, a structural reinforcement and a first part of the main body according to a first embodiment of the invention.
Figure 4:
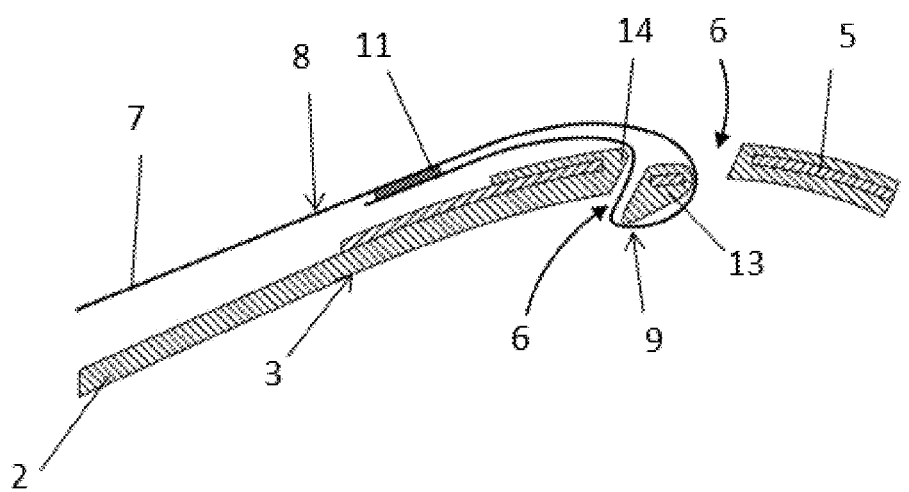
FIG. 4 is a section along the section plane III-III of FIG. 2 illustrating an assembly of a connecting member, a structural reinforcement and a first part of the main body according to a second embodiment of the invention.
Figure 5:
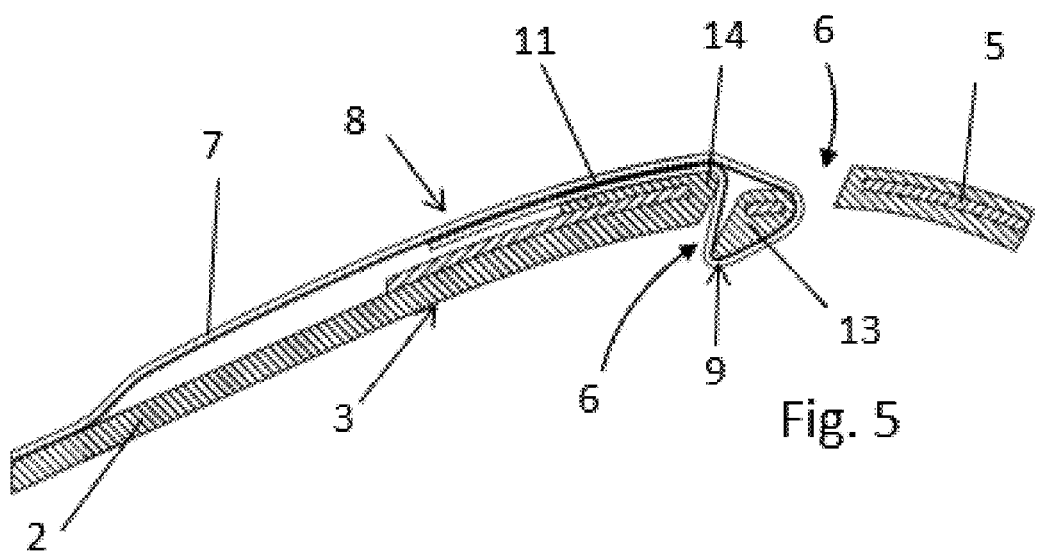
FIG. 5 is a section along the section plane III-III of FIG. 2 illustrating an assembly of a connecting member, a structural reinforcement and a first part of the main body according to a third embodiment of the invention.
Figure 6:
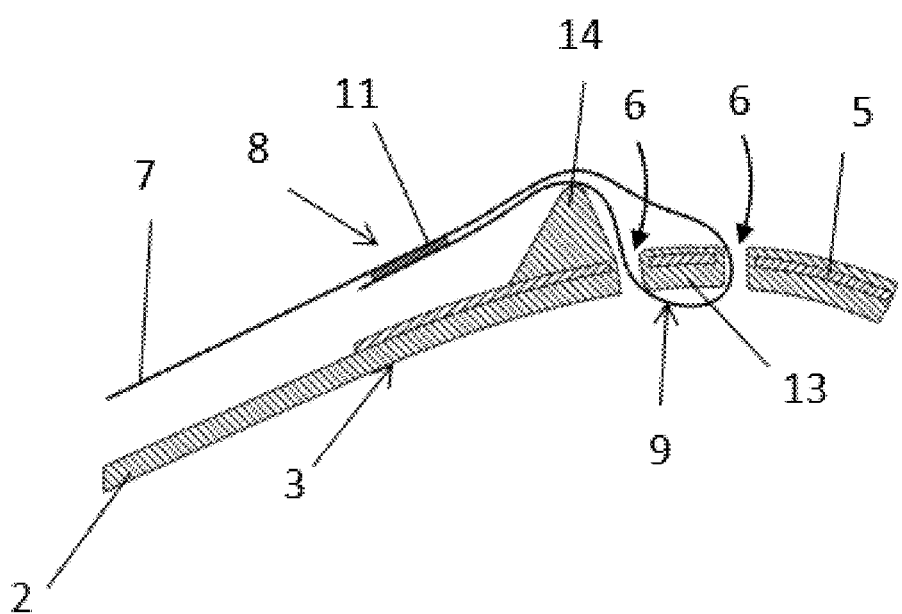
FIG. 6 is a section along the section plane III-III of FIG. 2 illustrating an assembly of a connecting member, a structural reinforcement and a first part of the main body according to a fourth embodiment of the invention.
Figure 7:
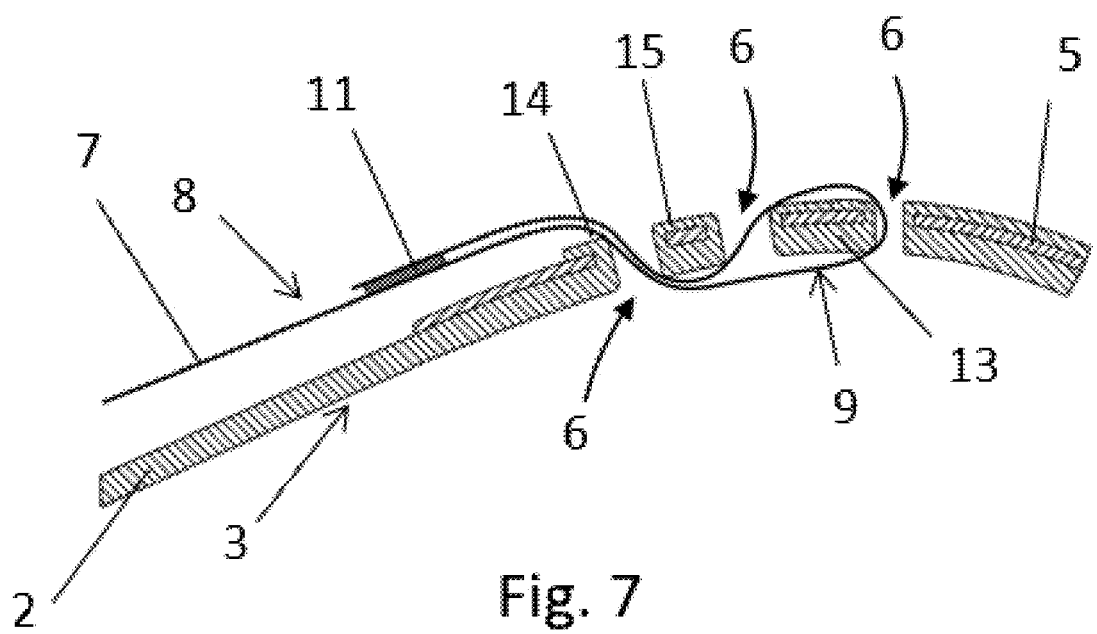
FIG. 7 is a section along the section plane III-III of FIG. 2 illustrating an assembly of a connecting member, a structural reinforcement and a first part of the main body according to a fifth embodiment of the invention

Another embodiment of the lock loop 9 is illustrated in FIG. 3. In this embodiment, the presence of two through-holes 6, each formed by two orifices facing one another, one of which is present in the first part 3 of the main body 2 and the other is present in the structural reinforcement 5. A portion of end 8 of the connecting member 7 is introduced, from the insertion side, into one of the through-holes 6, passes through it and out through the other through-hole 6, thus forming the lock loop 9 around the surface of part 1 separating the two through-holes 6. In this case, this surface is therefore the clamping element 13, around which the locking loop 9 is formed. In this embodiment, there is a crimped border 14 having a bevel-shaped relief, this relief being arranged to wedge a portion of the end 8 between said border 14 and another portion of the end 8 when the connecting member is tensioned. Therefore, the lock loop 9, once formed, can be tensioned, and with less risk of loosening of the loop 9. The clamping element 13 also has edges with a relief similar to that of the crimped border 14 which makes it possible to wedge the portion of the loop 9 with which each edge of the clamping element 13 is in contact, when tensioning the connecting member 7. Tensioning can be implemented either after the other end of the connecting member 7 has been connected to an anchor point of the second part 4, or after this other end has formed a second loop 9 around a second clamping element (not shown) located in another portion of the first part 3 of the part 1. The impact of such tensioning of the connecting member 7 on the end 8 is illustrated in FIG. 5. The edge 14 may be considered for the embodiment described above. The edge 14 and its particular relief may be formed during overmolding of the structural reinforcement 5 by the plastic material forming the first part 3 of the main body 2, as shown in FIGS. 3 to 7. However, such crimped edges 14 may be formed during manufacture of the main body 2, independently of its fastening with the structural reinforcement 5. In this first embodiment, the pulling strand of the end 8 of the connecting member is wedged between a crimped edge 14 and the non-pulling strand of the end 8 which further secures the holding of the lock loop 9 over time. In addition, an adhesive 11 is applied between the free edge and the non-free edge of the end 8, over a substantial length, once the lock loop 9 is formed. The application of this adhesive 11 provides additional security in the case where the tension applied to the connecting member 7 is not optimal or deteriorates over time.

The second embodiment (FIG. 4) of the piece 1 of the invention differs from the first embodiment previously described as follows. The clamping element 13 has a protuberance projecting from the side opposite to the insertion side. Such a protrusion participates in allowing an excellent wedging of the end 8 at the crimped edge 14, once the connecting member 7 is tensioned. In addition, an adhesive 11 is also applied between the free edge and the non-free edge of the end 8, once the lock loop 9 is formed.

The third embodiment of the invention (FIG. 5) differs from the second embodiment (FIG. 4) in that an adhesive layer 11 is applied over the entire length of the end 8 of the connecting member 11. Thus, when tensioning the connecting member 7, the part of the end 8 which is in contact with the clamping element 13 adheres to the latter. The pulling strand of the end 8 also adheres to a longer length than the non-pulling strand of the end 8. Therefore, in addition to providing additional security, it is then possible to adhere the braid on the main body 2 which also prevents any noise that may be caused by undesirable movements of the pulling strand of the end 8 against the main body 2.

The fourth embodiment (FIG. 6) differs from the first embodiment (FIG. 3) in that the crimped edge 14 forms a protuberance projecting from the insertion side. This shape of the crimped edge 14 makes it possible to increase the force with which the pulling strand of the end 8 is pinched between the non-pulling strand of the end 8 and the crimped edge 14, when the connecting member 7 is tensioned.

In the fifth embodiment (FIG. 7), part 1 is provided with an additional clamping element 15 situated between the clamping element 13 and the portion of the first part 3 which comprises the crimped edge 14. Specifically, the bodywork part 1 according to the fifth embodiment has three through-holes 6, two of which are located on either side of the additional clamping element 15 and one between the clamping element 13 and the portion of the first part 3 that does not include the crimped edge 14. In this embodiment, the lock loop 9 is thus formed. From the insertion side, the pulling strand of the end 8 is introduced into the hole located between the first part 3 and the additional clamping element 15. From the side opposite to the insertion side, the pulling strand is passed through the hole between the additional clamping element 15 and the clamping element 13. The pulling strand is then inserted into the last hole between the clamping element and the first part 3. Finally, the pulling strand is once again introduced into the hole between the first part 3 and the additional clamping element 15, but this time from the opposite side, so as to form the locking loop 9. The pulling strand is then attached to the non-pulling strand using an adhesive 11. Thus, two crimping of the end 8 of the connecting member 7 are affected on tensioning, namely one at the additional clamping element 15 and one at the crimping edge 14. Therefore, the formation of the lock loop 9 by the end 8 of the connecting member 7 is more secure.

The invention is not limited to the embodiments presented here and other embodiments will become clearly apparent to a person skilled in the art. It is in particular another possible embodiment of the possible invention in which the bodywork part is a side door or an embodiment in which more than two through-holes are provided and used for the formation of a locking loop.

LIST OF REFERENCES

1: bodywork part
2: main body
3: first part of the main body
4: second part of the main body
5: structural reinforcement
6: through-hole
7: connecting member
8: end of the connecting member
9: lock loop of the connecting member
10: lock block
11: adhesive
13: clamping element
14: crimped edge of the connecting member
15: additional clamping element of the connecting member

The invention claimed is:

1. A motor vehicle bodywork part comprising:
a main body of plastic material comprising at least a first part and a second part, the first part having at least one orifice,
at least a structural reinforcement fastened at least partially on the first part, the structural reinforcement having at least one orifice facing the orifice of the first part, so as to form a through-hole,
at least one connecting member of the first part and the second part comprising an end, the end comprising at least one portion penetrating at least once into the through-hole and forming a lock loop around a clamping element so as to secure the at least one connecting member, the structural reinforcement and the first part.

2. The motor vehicle bodywork part according to claim 1, wherein the first part of at least one of the main body and the structural reinforcement comprise, at the periphery of respective orifices thereof, at least one edge having a relief capable of wedging the portion of the end forming the lock loop.

3. The motor vehicle bodywork part according to claim 1, wherein a portion of the end inserted into the through-hole is fastened to a non-introduced portion of the end.

4. The motor vehicle bodywork part according to claim 1, wherein the at least one connecting member is connected to an anchor point of the second part.

5. The motor vehicle bodywork part according to claim 1, further comprising a second structural reinforcement fastened at least partially onto the first part of the main body, the second structural reinforcement having the at least one orifice facing an orifice of the first part of the main body, so as to form a second through-hole.

6. The motor vehicle bodywork part according to claim 5, wherein the at least one connecting member comprises a second end, the second end comprising at least one portion penetrating at least once into the second through-hole and forming a second lock loop around a second clamping element so as to secure the connecting member, the second structural reinforcement and the first part.

7. The motor vehicle bodywork part according to claim 5, further comprising a second connecting member of the first part and the second part comprising an end, the end comprising at least a portion penetrating at least once into the second through-hole and forming a second lock loop around a second clamping element so as to secure the second connecting member, the second structural reinforcement and the first part.

8. The motor vehicle bodywork part according to claim 7, wherein the second connecting member is connected to an anchor point of the second part, the anchoring point being, for example, a lock block.

9. The motor vehicle bodywork part according to claim 1, wherein the motor vehicle bodywork part is an opening part.

10. A method of manufacturing a bodywork part of a motor vehicle, the method comprising:
producing of at least one structural reinforcement comprising at least one orifice,
producing of a main body of plastic material, the main body being subdivided into at least a first part and a second part, the first part having at least one orifice intended to be positioned facing the orifice of the structural reinforcement,
fastening of the structural reinforcement at least partially on the first part of the main body so that the facing orifices form a through-hole,
introduction of at least a portion of an end of a connecting member of the first part and the second part into the through-hole forming a lock loop around a clamping element so as to secure the connecting member, the structural reinforcement and the first part.

11. The method according to claim 10, wherein the steps of producing the main body and fastening of the structural reinforcement at least partially on the first part of the main body are carried out concomitantly by overmolding the structural reinforcement during molding of the main body.

12. The motor vehicle bodywork part according to claim 3, wherein the portion of the end inserted into the through-hole is fastened by adhesive.

13. The motor vehicle bodywork part according to claim 4, wherein the anchor point is a lock block.

14. The motor vehicle bodywork part according to claim 9, wherein the opening part is selected from the group consisting of a hatchback and a side door.

* * * * *

UNITED STATES PATENT AND TRADEMARK OFFICE
CERTIFICATE OF CORRECTION

| | | |
|---|---|---|
| PATENT NO. | : 11,207,956 B2 | Page 1 of 1 |
| APPLICATION NO. | : 16/722031 | |
| DATED | : December 28, 2021 | |
| INVENTOR(S) | : Coudron | |

It is certified that error appears in the above-identified patent and that said Letters Patent is hereby corrected as shown below:

On the Title Page

Replace "(71) Applicant: Compagnie Plastic Omnium, Lyons (FR)" with --(71) Applicant: Compagnie Plastic Omnium, Lyon (FR)--

Replace "(73) Assignee: Compagnie Plastic Omnium, Lyons (FR)" with --(73) Assignee: Compagnie Plastic Omnium, Lyon (FR)--

Signed and Sealed this
Twenty-second Day of February, 2022

Drew Hirshfeld
*Performing the Functions and Duties of the*
*Under Secretary of Commerce for Intellectual Property and*
*Director of the United States Patent and Trademark Office*